Patented Nov. 6, 1934

1,979,753

UNITED STATES PATENT OFFICE 1,979,753

OPEN-HEARTH SLAG UTILIZATION

James E. Lose and Ralph H. Watson, Munhall, Pa.

No Drawing. Application November 14, 1932, Serial No. 642,679

3 Claims. (Cl. 75—76)

This invention is a method of utilizing basic open-hearth slag by the recovery of relatively large amounts of its manganese, phosphorus and iron.

The method is particularly characterized in that the slag forms the metal producing burden of a blast-furnace without necessarily the addition of ore, scrap, etc. The slag is charged in the furnace along with fuel and, if necessary, a suitable fluxing material. Siliceous material may also be added, depending upon the desired silicon content of the iron to be produced. Although high or low phosphorus and/or siliceous manganiferous ore may be used, it should not comprise the major portion of the burden.

The above operation produces a high manganese, high phosphorus iron which is treated in a basic furnace or converter to oxidize the manganese so that a high manganese slag results which may be smelted to produce ferro-manganese for use as spiegel. The metal produced is an iron of rather low manganese and high phosphorus content.

This high phosphorus iron is further treated in a basic furnace or converter to oxidize the phosphorus so that a high phosphorus slag results. The metal produced is either a semi-steel which may be converted in an open-hearth or a steel which may be used with no further treatment except for deoxidation, these depending on whether the furnace or converter is used.

The phosphorus in this phosphorus slag is in the form of phosphoric acid to a large extent soluble in citric acid or ammonium citrate, indicating that it may be quite successfully used for fertilization purposes in agriculture. This slag should, of course, be mixed with other materials to furnish the needed elements to the soil to be fertilized.

The open-hearth slag to be treated by the present method may be that ordinarily discharged from a basic furnace and have the conventional range of constituents, such as the following:

|  | Per cent |  |
|---|---|---|
| Iron | from 18.0 to 27.0 |
| Manganese | from 5.0 to 10.0 |
| Phosphorus | from 0.3 to 1.5 |
| Silica | from 15.0 to 30.0 |
| Alumina | from 2.0 to 4.0 |
| Lime | from 20.0 to 50.0 |
| Magnesia | from 4.0 to 10.0 |

The product of the above after treatment in the blast-furnace may be an iron of the following constituents:

|  | Per cent |
|---|---|
| Manganese | from 12.0 to 24.0 |
| Phosphorus | from 1.5 to 3.0 |
| Silicon | from 0.3 to 0.7 |
| Sulphur under | 0.03 |
| Carbon | from 4.0 to 4.5 |

This blast-furnace product may be called phospho-spiegel and in the case of a basic open-hearth or electric furnace may be charged along with iron, roll scale and other iron oxides. These oxidize the manganese and silicon, when the metal is at a high temperature, so they enter the slag. When the manganese is reduced to a sufficient extent, for instance under 1%, carbon is added to the slag in the furnace to decrease the phosphorus and iron oxide. This carbon may be coke or coal thrown on the slag in a layer. When the iron oxide has been reduced to about 4 to 6% it has been found that the phosphorus has been reduced to from .05% to .3%.

The slag produced by this open-hearth treatment may have a composition as follows:

|  | Per cent |
|---|---|
| Manganese | from 35.0 to 55.0 |
| Phosphorus | from 0.05 to 0.30 |
| Iron | from 3.0 to 5.0. |

The iron produced at this time may have a composition as follows:

|  | Per cent |
|---|---|
| Manganese | from 1.0 to 4.0 |
| Phosphorus | from 1.5 to 3.0 |
| Silicon under | 0.1 |
| Carbon | from 2.0 to 3.0. |

As stated, the above slag has a manganese content high enough to be used as a burden for a ferro-manganese furnace or for spiegel.

The iron obtained by this open-hearth treatment may be subjected to further treatment in the same furnace or removed to another basic open-hearth or electric furnace, the latter probably being preferable in most instances. During this second basic furnace treatment iron ore, roll scale, etc. and lime is added to the metal while at a comparatively low temperature, so that the phosphorus oxidizes and enters the slag. When the metal's phosphorus content reduces to a sufficient extent, below .3%, the furnace is tapped and the slag separated from the iron. The iron produced is in the form of a semi-steel of the following typical analysis:

| | Per cent |
|---|---|
| Carbon | 2.00 |
| Manganese | 1.70 |
| Phosphorus | 0.30 |
| Sulphur | 0.01 |
| Silicon | 0.01 |

The treatment may also be effected by a basic Bessemer converter either entirely or at different stages. That is to say, the metal produced at one stage by the basic furnace might be further treated by a basic converter, or vice versa.

The method will now be disclosed when a Bessemer converter is used.

The phospho-spiegel produced from the blast-furnace is transferred to a basic converter and blown with air. The manganese, silicon and some iron oxidizes and raises the temperature to a high degree, so that little phosphorus is oxidized and enters the slag. When the manganese content of the metal is reduced to a sufficient degree, under 1%, the phosphorus and iron oxide in the slag should be low. If the iron oxide is not sufficiently low, carbon may be added. This reduces the iron oxide and the phosphorus. The converter is then tapped and the metal and slag separated by pouring or teeming. This metal and slag will have substantially the same constituents as that produced by the basic furnace procedure. The slag produced will be used for its manganese content, as has been previously described.

To effect the recovery of the iron and phosphorus the metal produced by the converter may be blown according to the usual basic Bessemer practice so that the remaining manganese, carbon and phosphorus are consecutively oxidized. The metal left may be classed as steel, while the slag contains the manganese and phosphorus. This slag may be used for fertilization purposes in the manner previously suggested.

If the last mentioned Bessemer blow is conducted so that oxidation of the phosphorus occurs at a low temperature the carbon may not be properly oxidized. The addition of roll scale and lime in sufficient quantities will assure almost complete oxidation of the phosphorus and the retention of most of the carbon in the iron so that it may be used in an open-hearth to produce acceptable steel.

The slag produced by either the basic furnace or converter procedures and which is to be used for fertilization purposes will be of substantially the following composition:

| | Range | | Typical |
|---|---|---|---|
| | Per-cent | Per-cent | Per-cent |
| Silica | From 2.0 to | 6.0 | 4.0 |
| Alumina | From 1.0 to | 2.0 | 1.4 |
| Lime | From 40.0 to | 50.0 | 45.8 |
| Magnesia | From 1.0 to | 5.0 | 1.9 |
| Mang. oxide | From 10.0 to | 20.0 | 14.2 |
| Ferrous oxide | From 5.0 to | 10.0 | 6.9 |
| Phosphoric acid | From 18.0 to | 30.0 | 24.9 |
| Sol. phos. acid | | | 22.6 |

In the above analysis it is to be noted that the phosphorus is relatively high and the silica relatively low.

We claim:

1. The method of utilizing basic open-hearth furnace slag by smelting it in the presence of a reducing agent to obtain a high manganese and phosphorus product and treating this product in a basic converter to obtain a high manganese slag and a high phosphorus slag.

2. The method of utilizing basic open-hearth furnace slag by smelting it in the presence of a reducing agent to obtain a high manganese and phosphorus iron, and treating said iron in a basic converter to oxidize the manganese therein to produce a high manganese slag and a high phosphorus iron, and treating said high phosphorus iron in a basic converter to oxidize the phosphorus to produce a high phosphorus slag.

3. The method of utilizing basic open-hearth furnace slag by smelting it in the presence of a reducing agent to obtain a high manganese and phosphorus product, oxidizing this product in a basic converter so as to produce a high manganese, low phosphorus slag and a low manganese, high phosphorus iron and oxidizing said low manganese, high phosphorus iron in a basic converter to produce a usable metal and a high phosphorus slag.

JAMES E. LOSE.
RALPH H. WATSON.